(12) United States Patent
Matei

(10) Patent No.: US 12,208,503 B2
(45) Date of Patent: Jan. 28, 2025

(54) HAND HELD POWER TOOL WITH LASER MEASURING SYSTEM AND INTERACTIVE DISPLAY

(71) Applicant: ROBBOX INC., Richmond (CA)

(72) Inventor: Andrei Matei, Richmond (CA)

(73) Assignee: ROBBOX INC., Richmond (CA)

( * ) Notice: Subject to any disclaimer, the term of this patent is extended or adjusted under 35 U.S.C. 154(b) by 0 days.

(21) Appl. No.: 17/365,589

(22) Filed: Jul. 1, 2021

(65) Prior Publication Data

US 2022/0126435 A1    Apr. 28, 2022

Related U.S. Application Data

(63) Continuation of application No. 16/468,129, filed as application No. PCT/IB2018/001522 on Dec. 4, 2018, now Pat. No. 11,052,532.

(60) Provisional application No. 62/594,055, filed on Dec. 4, 2017.

(51) Int. Cl.
*B25F 5/02*    (2006.01)
*B23B 49/00*    (2006.01)
*B25F 5/00*    (2006.01)
*G01S 7/481*    (2006.01)

(52) U.S. Cl.
CPC ............... *B25F 5/02* (2013.01); *B23B 49/00* (2013.01); *B25F 5/001* (2013.01); *G01S 7/4813* (2013.01); *B23B 2260/128* (2013.01)

(58) Field of Classification Search
CPC ..... B25F 5/02; B23B 49/00; B23B 2260/128; G01S 7/4813
See application file for complete search history.

(56) References Cited

U.S. PATENT DOCUMENTS

| | | | | |
|---|---|---|---|---|
| 6,587,184 | B2 * | 7/2003 | Wursch | G01S 17/88 |
| | | | | 7/163 |
| 6,898,860 | B2 | 5/2005 | Wu | |
| 9,114,494 | B1 * | 8/2015 | Mah | B25H 1/0092 |
| 2002/0145724 | A1 * | 10/2002 | Wursch | B25H 1/0092 |
| | | | | 356/152.2 |
| 2005/0261870 | A1 | 11/2005 | Cramer et al. | |
| 2015/0187198 | A1 | 7/2015 | Silverberg et al. | |
| 2017/0014984 | A1 * | 1/2017 | Rola | B25F 5/00 |
| 2019/0283196 | A1 * | 9/2019 | Shao | G01S 17/87 |

FOREIGN PATENT DOCUMENTS

| | | | | | |
|---|---|---|---|---|---|
| CA | | 2449639 A1 * | 5/2004 | ......... | B25H 1/0092 |
| DE | | 2838968 A * | 3/1980 | ......... | B23B 49/006 |
| DE | 10 2010 003 489 A1 | | 10/2010 | | |
| DE | 10 2010 040 995 A1 | | 3/2012 | | |

OTHER PUBLICATIONS

International Search Report and Written Opinion issued on Apr. 24, 2019 in PCT/IB2018/001522 filed on Dec. 4, 2018.
Olney "Multilayer PCB Stackup Planning" *In-Circuit Design Pty Ltd.*, Australia (Year: 2010).

\* cited by examiner

*Primary Examiner* — Daniel Jeremy Leeds
(74) *Attorney, Agent, or Firm* — Oblon, McClelland, Maier & Neustadt, L.L.P.

(57) ABSTRACT

The present disclosure relates to powered hand tools and, in particular, their combination with a laser measuring system to measure a distance between a tool and a reference surface such as a wall, floor, or ceiling.

18 Claims, 15 Drawing Sheets

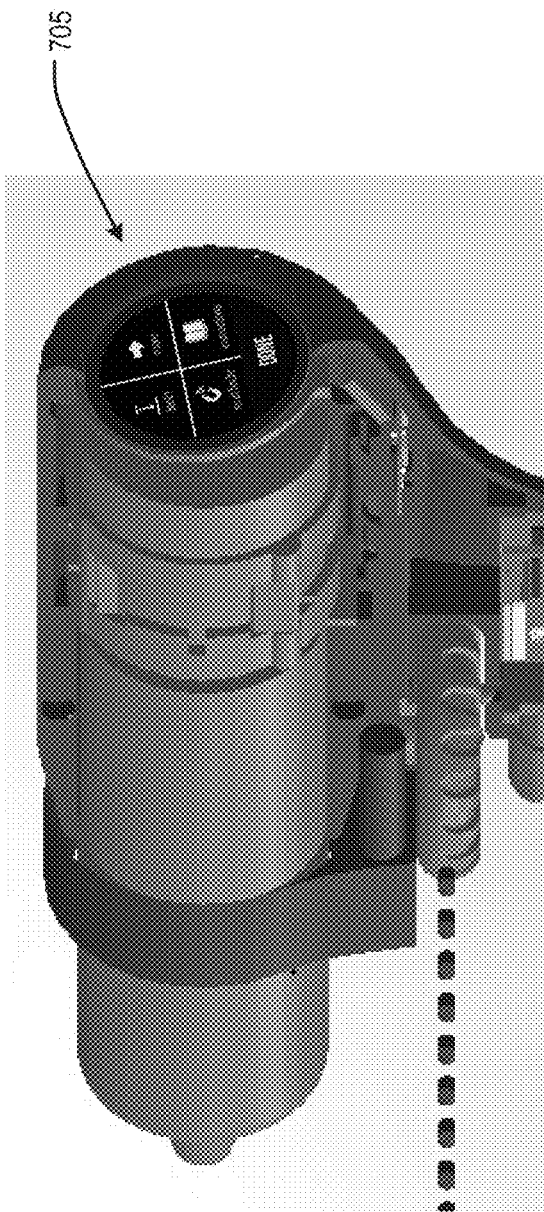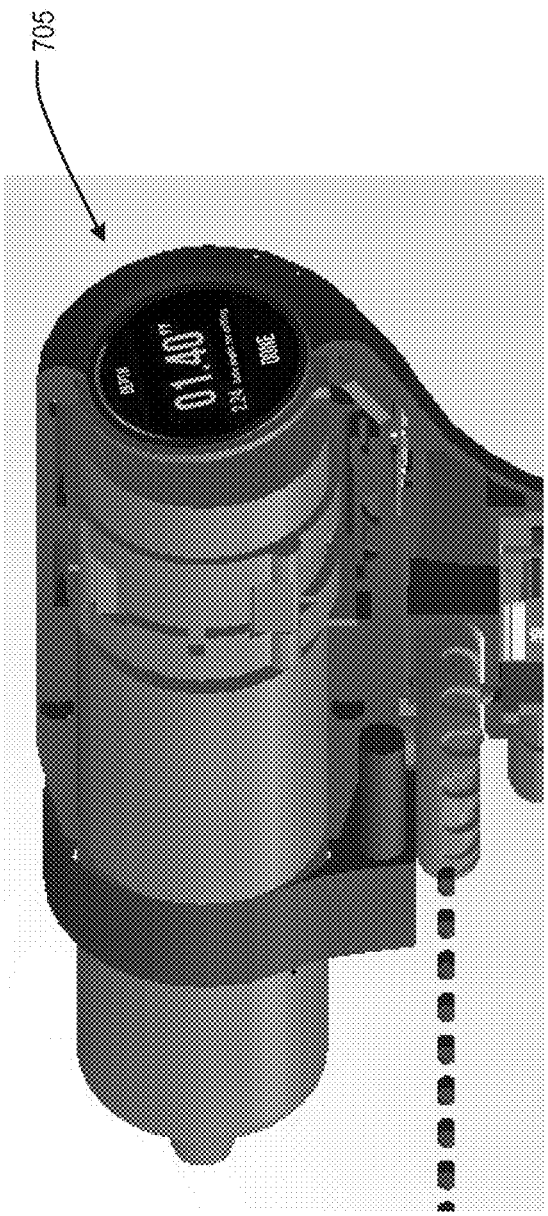

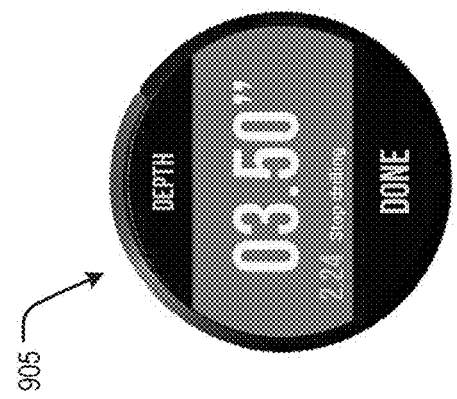
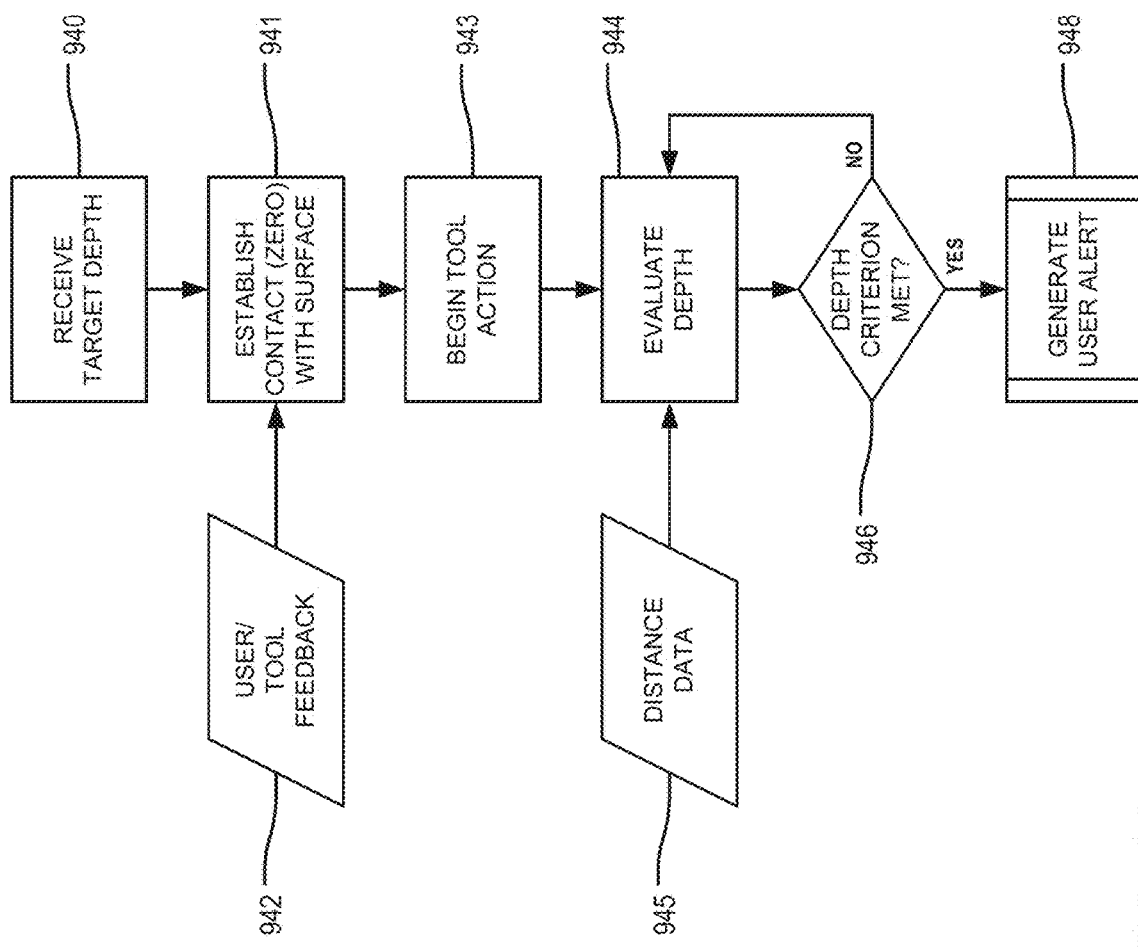
FIG. 9A
FIG. 9B

HAND HELD POWER TOOL WITH LASER MEASURING SYSTEM AND INTERACTIVE DISPLAY

CROSS-REFERENCE TO RELATED APPLICATIONS

This application is a continuation of U.S. application Ser. No. 16/468,129, filed Jun. 10, 2019, which is a 371 of international PCT/IB2018/001522 filed on Dec. 4, 2018, and claims the benefit of priority to U.S. Provisional Application No. 62/594,055, filed Dec. 4, 2017, the teachings of which is hereby incorporated by reference in its entirety for all purposes.

BACKGROUND

Field of the Disclosure

The present disclosure relates to powered hand tools and their combination with a laser measuring system.

Description of the Related Art

Traditionally, for the positioning of a hand held power tool on a wall, separate measuring components or devices are needed. These can be a variety of contact or non-contact distancing methods. However, as this requires a craftsman to set down one piece of equipment whilst operating a second piece of equipment, it would be advantageous for craftsmen to be able to confidently position a hand held power tool, for example a power drill, on the wall without the need of a separate measuring device.

As alluded to in the above, it is typically sufficient in a room to understand the distance between two walls and the distance from the floor to the ceiling. However, obtaining an understanding of these distances has often required additional, cumbersome equipment to properly dimension the room. To this end, strategies include fixing stationary distance methods to a superior surface of a hand held power tool and attaching movable distancing methods to a chuck of a hand held power tool. Importantly, the above approaches, in addition to many others, are inconsistent in establishing a coordinate system or fail to be integrated efficiently with the user.

This void of usable distancing methods is addressed herein.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a hand held power tool, comprising a primary motor, a chuck operatively-coupled to the primary motor, a body housing the primary motor, a display mounted on a rear surface of the body, said display being positioned opposite the chuck, a handle projecting from the body, a rotatable distancing laser disposed within a rotatable laser housing, the rotatable laser housing being rotatably coupled to the body immediately inferior to the chuck, the rotatable laser housing being disposed such that a laser beam emitted from the rotatable distancing laser is emitted in a plane parallel to a plane of an axis of rotation of the chuck, and a stationary distancing laser disposed within the handle of the hand held power tool and arranged such that a laser beam emitted from the stationary distancing laser is orthogonal to an emitted laser beam of the rotatable distancing laser.

The present disclosure further relates to a hand held power tool, comprising a motor, a chuck operatively-coupled to the motor, a body housing the motor, a handle projecting from the body, a rotatable distancing laser disposed within a rotatable laser housing, the rotatable laser housing being rotatably coupled to the body immediately inferior to the chuck, the rotatable laser housing being arranged such that a laser beam emitted from the rotatable distancing laser is emitted in a plane parallel to a plane of an axis of rotation of the chuck, a stationary distancing laser disposed within the handle of the hand held power tool and arranged such that a laser beam emitted from the stationary distancing laser is orthogonal to an emitted laser beam of the rotatable distancing laser, and processing circuitry configured to control the rotatable distancing laser and the stationary distancing laser, said processing circuitry being housed within the handle.

The present disclosure further relates to a hand held power tool, comprising a motor, a chuck operatively-coupled to the motor, a body housing the motor, a handle projecting from the body, a display mounted on a rear surface of the body and visible to a user, said display being positioned opposite the chuck, and processing circuitry configured to control display of distancing information on the display, said distancing information being received from at least one distancing laser, wherein the display is substantially circular.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7C is an illustration of a display of a hand held power tool, according to an exemplary embodiment of the present disclosure;

FIG. 7D is an illustration of a display of a hand held power tool, according to an exemplary embodiment of the present disclosure;

FIG. 9A is a flowchart of an exemplary embodiment of a hand held power tool;

FIG. 9B is an illustration of a display of a hand held power tool during a depth measurement operation, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "user" and "craftsman", as well as the terms "users" and "craftsmen", as used herein, should be considered interchangeable and are merely used to convey and end user of the invention. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

For a craftsman, the ability to accurately dimension a workspace while continuing to operate a hand held power tool is currently limited. To this end, early efforts have resulted in limited dimensioning capabilities. Moreover, there remains a pronounced deficiency in integration of hand held power tools with modern technological capabilities.

Figure 1:
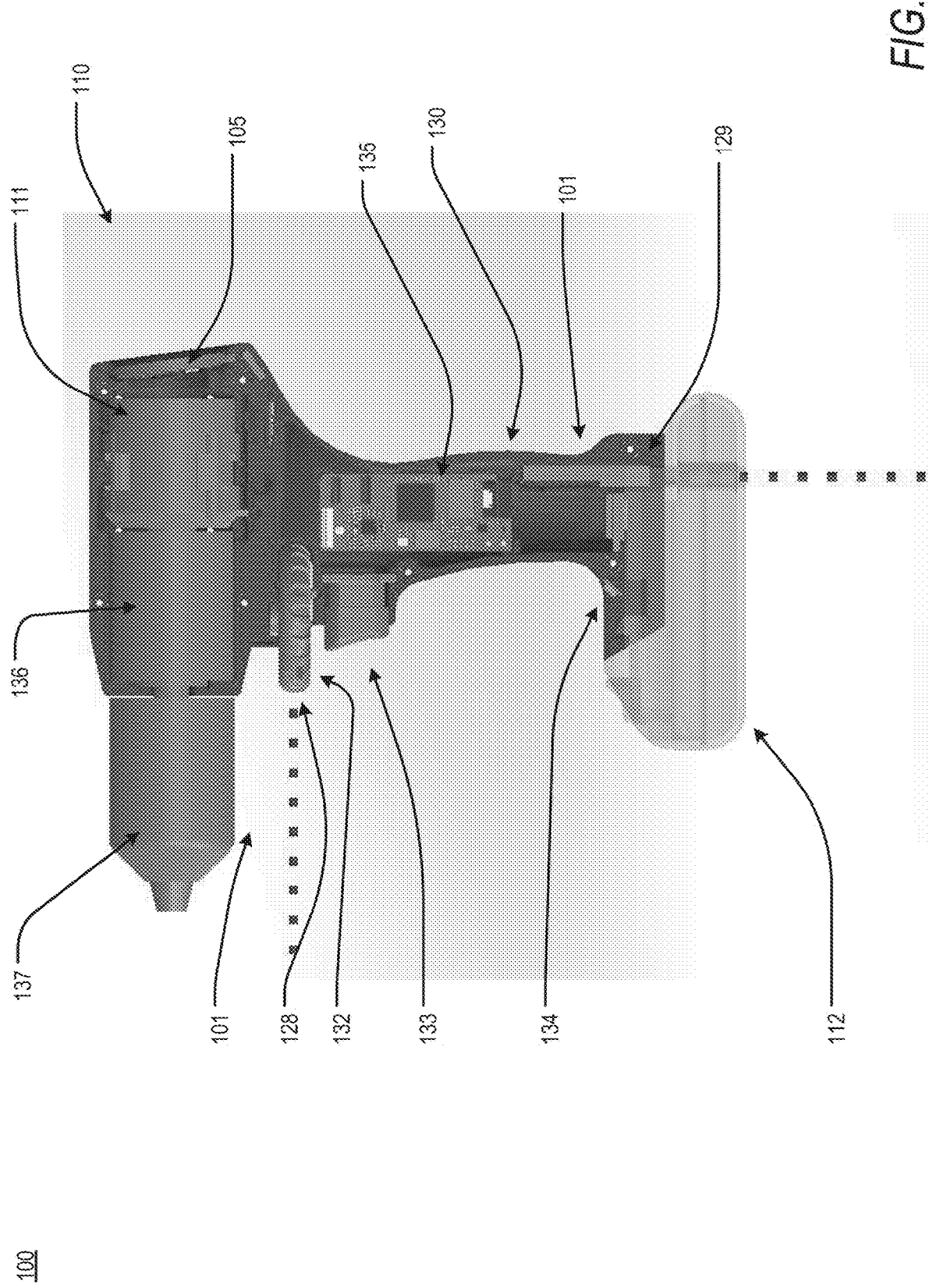
FIG. 1 is an illustration of a side view of a hand held power tool assembly, according to an exemplary embodiment of the present disclosure.

Accordingly, FIG. 1 is a hand held power tool assembly 100 including a hand held power tool 110, a laser measuring system 101, and a display 105. The hand held power tool 110 can be a drill, a router, a saw, or any other tool that is held by the user during use and powered electrically or pneumatically. For illustrative purposes, and as shown in FIG. 1 in a non-limiting example, the hand held power tool 110 is a power drill.

According to an embodiment, the hand held power tool 110 includes, at least, a motor 111, a battery 112 supplying power to the motor 111, and one or more printed circuit boards (PCBs) 135. The motor 111 can include a shaft (not shown) coupled to a gearbox 136 and, subsequently, to a clamp such as, for instance, a chuck 137, that allows for controlled rotation of a tool during an operation. In an example, the motor 111 can be, among others, a brushed motor or a brushless motor. In an embodiment, the hand held power tool 110 includes processing circuitry, including a motion controller, for controlling actions of the motor 111 in response to, among other things, user interaction with a trigger 133 of the hand held power tool 110. The trigger 133 can be communicatively coupled to the processing circuitry on the PCB 135 and the motion controller therein and, subsequently, to the motor 111 of the hand held power tool 110. In this way, the craftsmen can control activation of the motor 111 during an operation. In an embodiment, the trigger 133 can be accompanied by a directional control, allowing the craftsmen to control the direction of rotation of the motor 111 (e.g. clockwise or counterclockwise). Further to the above, an action of the motion controller of the processing circuitry can include speed and torque regulation. For example, if a prescribed torque of a specific operation has been surpassed, the speed and torque regulator of the motion controller can act on the motor 111, accordingly.

The above-described processing circuitry, described in greater detail below and with reference to FIG. 12, can reside on the one or more PCBs 135. Moreover, though it should be appreciated that any of the one or more PCBs can be disposed through the housing of the hand held power tool 110, according to an embodiment, the one or more PCBs 135 can be disposed within a handle 130 of the hand held power tool 110. The one or more PCBs 135 can be stacked across a dimension within the handle 130. As shown in FIG. 1, the one or more PCBs 135 are disposed within the handle 130 such that they are betwixt an at least one laser apparatus of the laser measuring system. Moreover, positioning the one or more PCBs 135 in the handle 130 isolates, to an extent, the one or more PCBs 135 from magnetic fields and heat produced by proximate components of the hand held power tool 110, including the motor 111 and the battery 112. In another embodiment, the one or more PCBs 135 can be remotely located and can be communicatively-linked to the hand held power tool 110 by local processing circuitry that, for instance, is a slave. To this end, the hand held power tool 110, and the one or more PCBs 135 communicatively-linked thereto, can include a wireless communication module comprising, for instance, a Bluetooth module.

According to an embodiment, the display 105 of the hand held power tool assembly 100 can be communicatively-coupled to the one or more PCBs 135 of the hand held power tool 110 and can be powered by the battery 112. In an example, the display 105 can be communicatively-coupled to a shared PCB 135 or to an independent PCB 135. The display 105 can be generally circular and be disposed on a rearward facing surface of the hand held power tool 110. In particular, the display 105 can be disposed such that, before, during, and after operation, the display 105 is visible to the craftsman and the craftsman is able to interact with the display 105 throughout. To this end, in an embodiment, the display 105 can be a screen such as an active-matrix organic light-emitting diode with an integrated digitizer for touch screen applications. To enable craftsmen interaction, processing circuitry, for instance the above-referenced processing circuitry integrated with the one or more PCBs 135, or otherwise disposed, can control the display 105. This control of the display 105 can include display output and/or display of information responsive to craftsmen interactions, said interactions being, for instance, verbal, tactile, or visual. Further to the above, the processing circuitry of the hand held power tool 110 can include a display driver on the one or more PCBs 135, or otherwise disposed, in order to control the display 105.

According to an embodiment, and in order to enable craftsmen interaction with the display 105 by a mode other than tactile interaction, the hand held tool assembly 100 can include a sound controller for controlling a speaker and/or microphone proximate the display 105 of the hand held power too assembly 100. The speaker enables audible communication with the craftsmen. Additionally, the microphone allows for, in an example, craftsmen control of the hand held power tool assembly 100, and the display 105 therein, via voice command.

According to an embodiment, the laser measuring system 101 includes a rotatable laser apparatus 128, disposed within a rotatable laser housing 132, and a stationary laser apparatus 129. The stationary laser apparatus 129 can be configured orthogonal to a plane of the rotatable laser apparatus 128. The rotatable laser housing 132 can be configured to rotate about a rotatable coupling such that the rotatable laser apparatus 128 can achieve, at least, 180° of rotation. As shown in FIG. 1, the rotatable laser housing 132 is disposed immediately below the chuck 137 of the hand held power tool 110 and proximate the trigger 133 such that a laser emitted from the rotatable laser apparatus 128, regardless of rotational position of the rotatable laser apparatus 128, is within a plane that is parallel to a plane of a rotational axis of the chuck 137. Further to this, and in addition to providing accurate measurements with respect to the working axis of the hand held power tool 110, the proximate location of the rotatable laser housing 132 to the trigger 133 allows for single handled control of the hand held power tool 110 and manipulation of the rotatable laser housing 132. Tactile features, described later, are disposed on the surface of the rotatable laser housing 132 to allow for improved control of the orientation of the rotatable laser apparatus 128 within the rotatable laser housing 132.

According to an embodiment, each laser apparatus of the laser measuring system 101 can include, at least, one or more laser emitting diodes and one or more laser receivers. The one or more laser emitting diodes and the one or more laser receivers can be coupled to signal conditioning circuitry and, subsequently, to processing circuitry on the one or more PCBs of the hand held power tool 110. Together, the diodes and receivers allow for the emission and reception of laser beams. In an example, the rotatable laser apparatus 128 and the stationary laser apparatus 129 each have a single set of one laser emitting diode and one laser receiver. The laser measuring system 101 will be described in detail throughout the remaining Figures, however, it can be appreciated that a variety of implementations of the laser measuring system 101 including, for example, distancing implementations, can be deployed according to, in part, methods understood by one of ordinary skill in the art. These methods can be based upon time of flight principles and the like. In an example, the laser measuring system 101 can be, among others, a laser having wavelengths in the infrared range and a distance measuring range of up to 50 meters.

To facilitate operation, according to an embodiment, the hand held power tool 110 can be further outfitted with a flashlight 134. The flashlight 134 can be configured to be activated upon providing power to the hand held power tool 110. In an embodiment, the flashlight 134 can be controlled by the above-described processing circuitry of the hand held power tool 110 such that the flashlight 134 is activated immediately prior to and during an operation, or, for example, when the trigger 133 is actuated.

Exploited in tandem with the laser measuring system 101, according to an embodiment, the hand held power tool assembly 100 can include an accelerometer/gyroscope module. The accelerometer/gyroscope module, communicatively-coupled with the above-described processing circuitry of the one or more PCBs 135 of the hand held power tool 110, can determine the orientation of the hand held power tool 110 relative to level. For example, data generated by the accelerometer/gyroscope module can indicate the reference angle between the axis of the tool and a level plane of the ground. When such an angle is zero, for example, the hand held power tool 110 is being held parallel to the ground. As described later with respect to the display 105 and tooling operations therein, the accelerometer/gyroscope module can be used to guide a user to a target position. It should be appreciated that the function of the accelerometer/gyroscope module can be duplicated, if crudely, by computations on data received from each of the rotatable laser apparatus and the stationary laser apparatus, wherein a local minima of a plurality of distancing measurements, in accordance with a known emission angle, can enable determination of, for instance, roll, pitch, yaw, and the like.

According to an embodiment, each of the above-described components of the hand held power tool assembly 100 can be communicatively-coupled via electrical contacts or via wireless communication. For example, the powered hand tool assembly 100 can include a Bluetooth module in communication with the above-described processing circuitry of the one or more PCBs 135 of the hand held power tool 110.

Figure 2A:
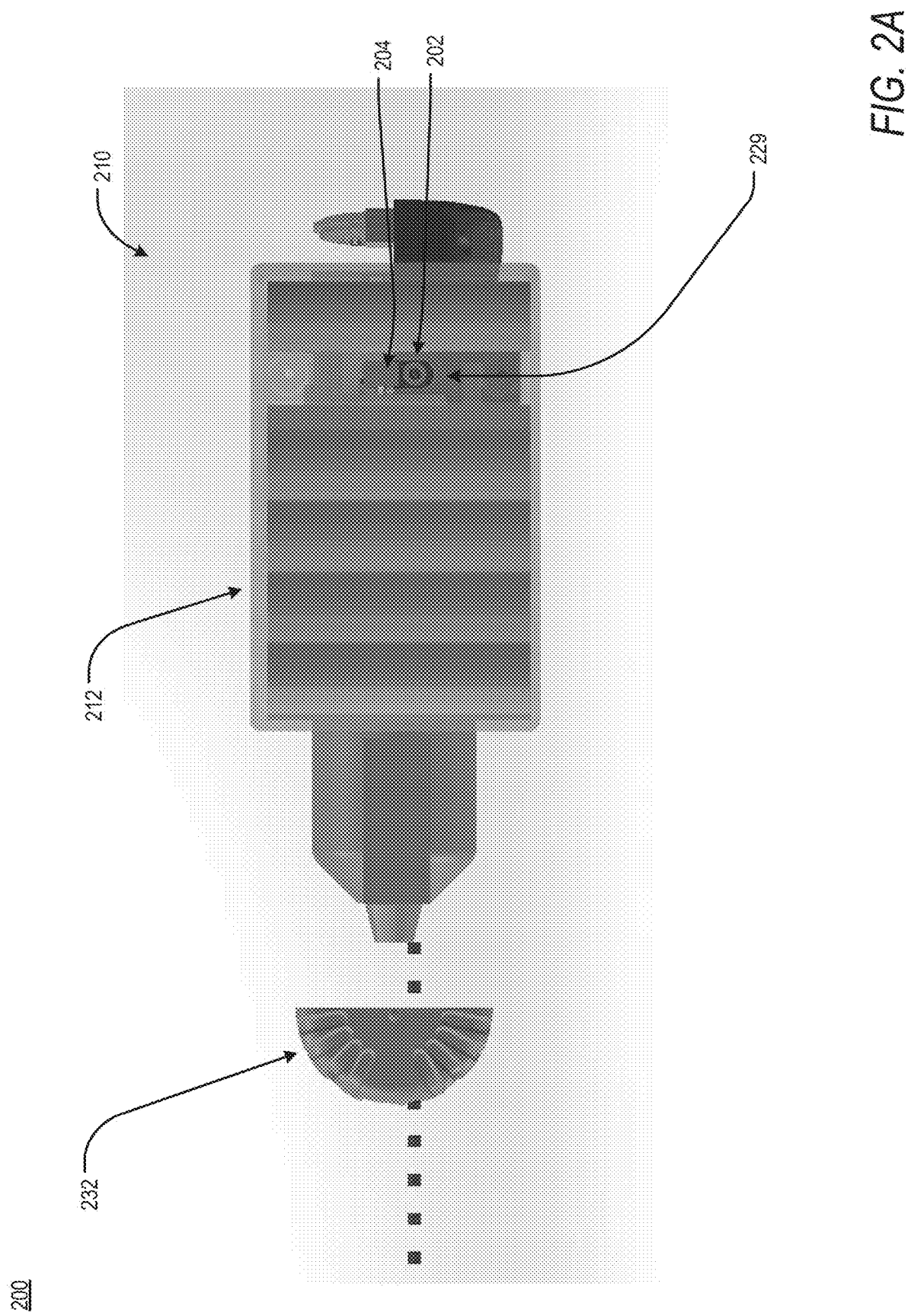
FIG. 2A is an illustration of a bottom view of a hand held power tool assembly, according to an exemplary embodiment of the present disclosure.

FIG. 2A provides a bottom view of a hand held power tool assembly 200 including a hand held power tool 210. According to an embodiment, the hand held power tool 210 includes a rotatable laser apparatus and a stationary laser apparatus 229. The rotatable laser apparatus is housed within a rotatable laser housing 232. Described in detail with respect to FIG. 4A-5B, the rotatable laser housing 232 is separable along a midline and, as such, only a first component is visible in the present view. Notably, FIG. 2A provides a view of the stationary laser apparatus 229 of the laser measuring system. To allow for function of the stationary laser apparatus 229, a cell of a battery 212 of the hand held power tool 210 is absent. As alluded to with reference to FIG. 1, the stationary laser apparatus 229 includes a laser emitting diode 202 and, positioned proximate to the laser emitting diode 202, a laser receiver 204. During operation, an emitted laser from the laser emitting diode 202 of the stationary laser apparatus 229 can be reflected from a surface or, for example, the floor, and be received at the laser receiver 204 of the stationary laser apparatus 229. Such functionality can be exploited according to known approaches including, for example, time of flight principles, for distancing.

Figure 2B:
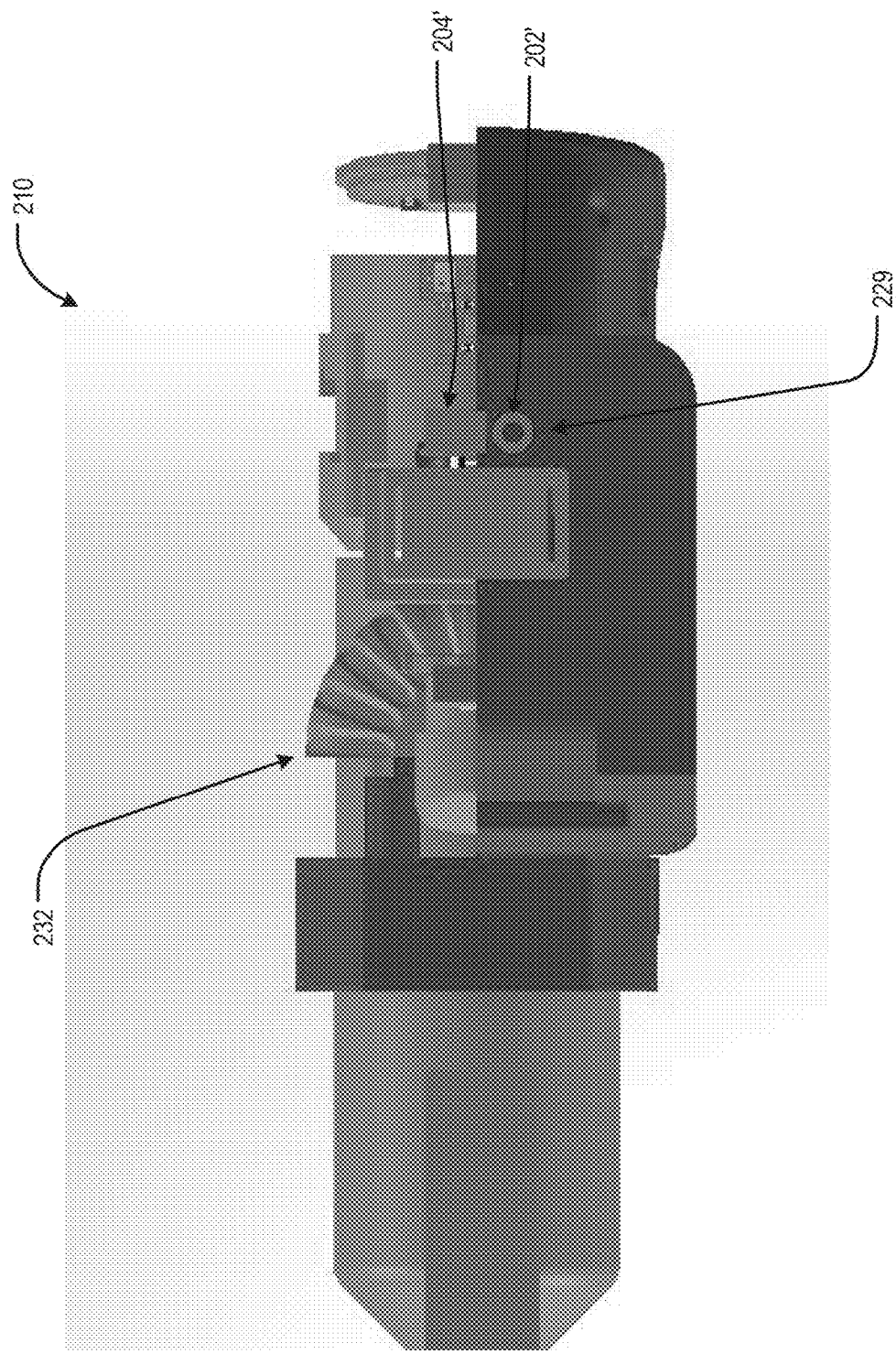
FIG. 2B is an illustration of a bottom view of a hand held power tool assembly, according to an exemplary embodiment of the present disclosure.

Similar to FIG. 2A, FIG. 2B is a bottom view of a hand held power tool assembly 200 including a hand held power tool 210. In FIG. 2B, a battery is completely removed from the bottom of a handle of the hand held power tool 210 such that a laser measuring system can be more easily viewed. According to an embodiment, the laser measuring system includes a rotatable laser apparatus, within a rotatable laser housing 232, and a stationary laser apparatus 229. As discussed above, and as described in detail with respect to FIG. 4A-5B, the rotatable laser housing 232 is separable along a midline and, as such, only a second component is visible in the present view. Further to the above, FIG. 2B provides a view of the stationary laser apparatus 229 of the laser measuring system. As alluded to with reference to FIG. 1, the stationary laser apparatus 229 includes a laser emitting diode 202 and, positioned proximate to the laser emitting diode 202, a laser receiver 204.

According to an embodiment, and as discussed with reference to FIG. 1, one or more PCBs, and the connections therein and thereof, of the hand held power tool are described in FIG. 3A and FIG. 3B.

Figure 3A:
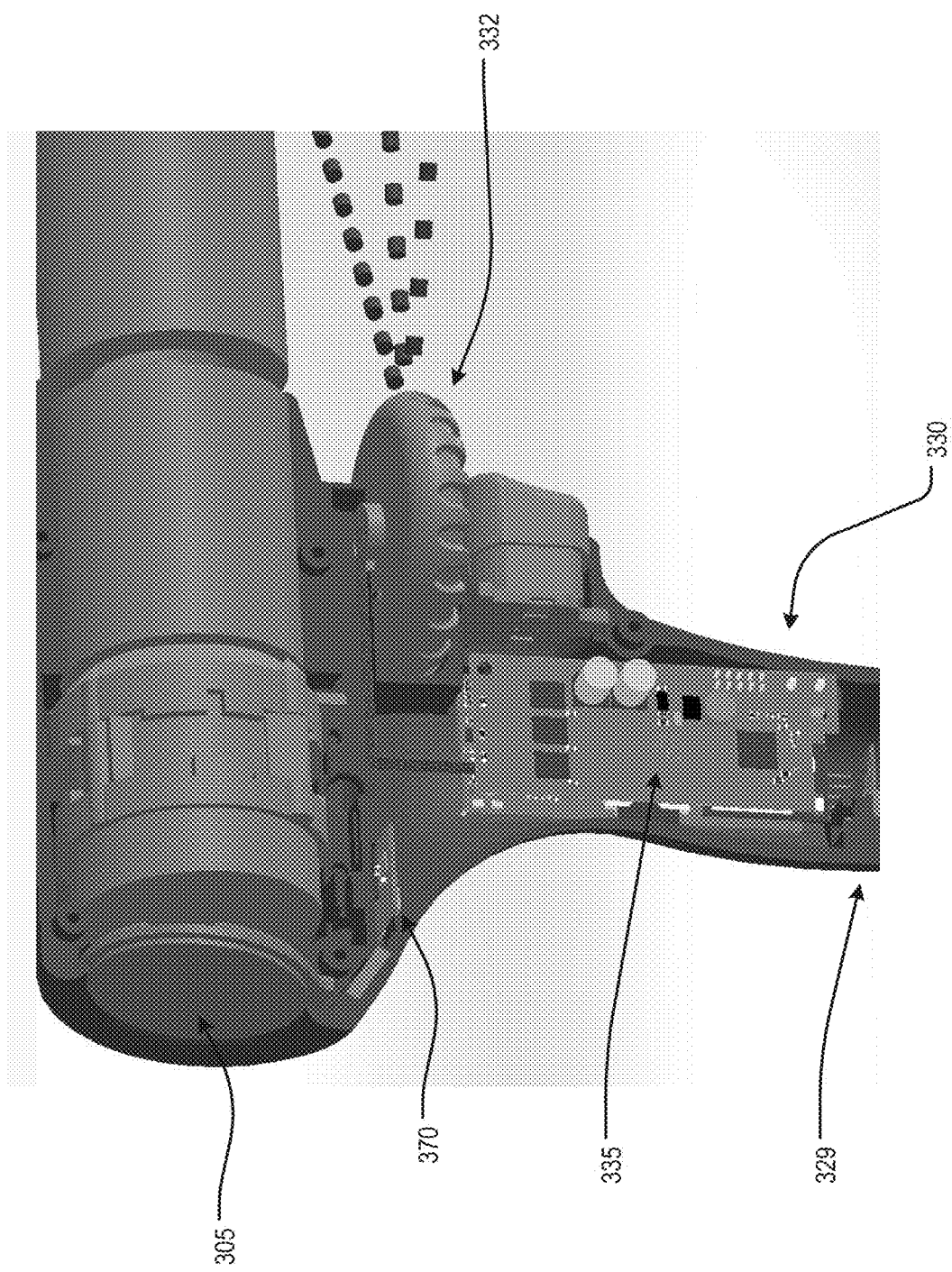
FIG. 3A is an illustration of a rear aspect of a hand held power tool assembly, according to an exemplary embodiment of the present disclosure.

FIG. 3A, including a rotatable laser housing 332, having a rotatable laser apparatus therein, and a stationary laser apparatus 329 of a laser measuring system, describes a hand held power tool assembly having one or more PCBs 335 and a display 305. The one or more PCBs 335, which, for example, can include a display PCB 370 having a display processing circuitry, are communicatively-coupled to the rotatable laser apparatus of the rotatable laser housing 332 and the stationary laser apparatus 329. The components of the laser measuring system and the display PCB 370 can be communicatively-coupled with the one or more PCBS 335 via wired or wireless communication. Again, the one or more PCBs 335 are illustrated as being housed within a handle 330 of the hand held power tool, an improvement over previous approaches reducing space demands and improving heat dissipation. In an example, the display 305 can be controlled by a display controller on the one or more PCBs 335 within the handle 330, the display PCB 370, or a combination thereof. In addition to the above, FIG. 3A provides another view of the proximity of the rotatable laser housing 332 to a trigger of the hand held power tool. Further, as indicated by dashed lines extending from the rotatable laser housing 332, the ability to rotate and measure distances in a plurality of directions is demonstrated.

Figure 3B:
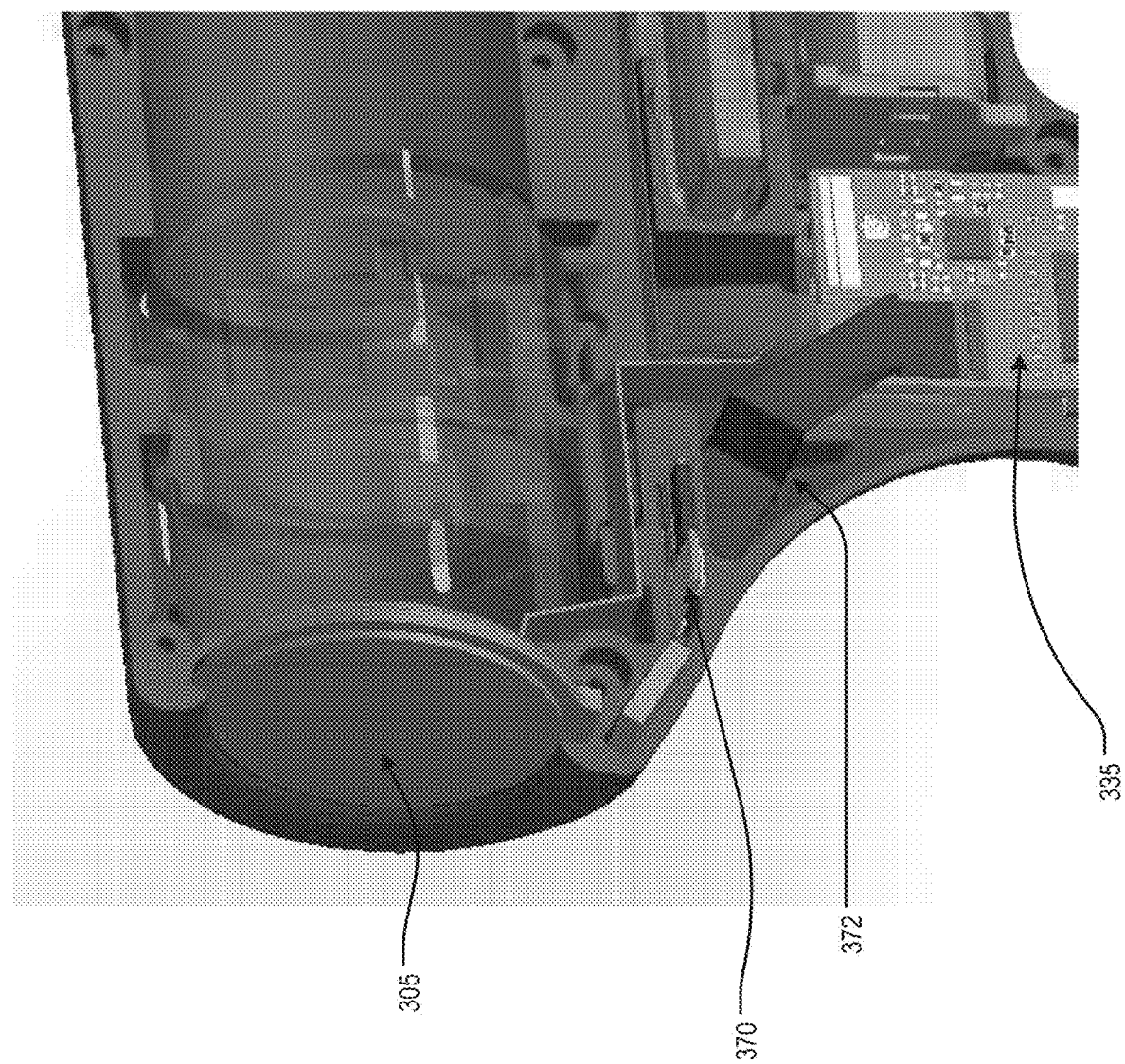
FIG. 3B is an illustration of an aspect of a hand held power tool assembly, according to an exemplary embodiment of the present disclosure.

FIG. 3B is a detailed view of the rear of a hand held power tool assembly wherein a display PCB 370 is communicatively-coupled to one or more PCBs 335 via a wired link 372. A display 305 disposed on the rear of a hand held power tool can be controlled by either the display PCB 370, the one or more PCBs 335, or a combination thereof.

As shown in FIG. 3B, the display 305 can be a shape suitable for the rear surface a of hand held power tool or, for instance, generally circular. The display 305 can be a screen for displaying information to a user. In addition, the display 305 can be a screen integrated with tactile capabilities for user engagement and interaction. Described in detail with reference to FIGS. 7A-7D and FIG. 11A and FIG. 11B, the display 305 can be configured to display information related to torque values of a chuck of the hand held power tool, distance measures from the rotatable laser apparatus and the stationary laser apparatus, including depth measures, and material information as entered by the user or as determined from acquired data. In an example, the display 305 can be configured to provide alerts to the user on performance and in order to improve user efficiency.

Figure 4B:
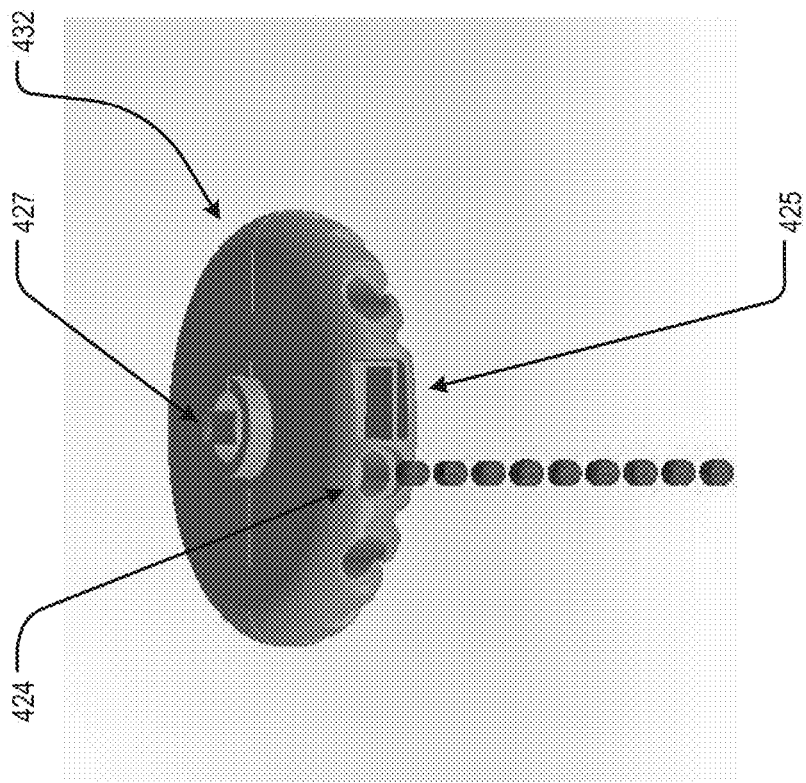
FIG. 4B is an illustration of a rotatable laser housing, according to an exemplary embodiment of the present disclosure.
Figure 4A:
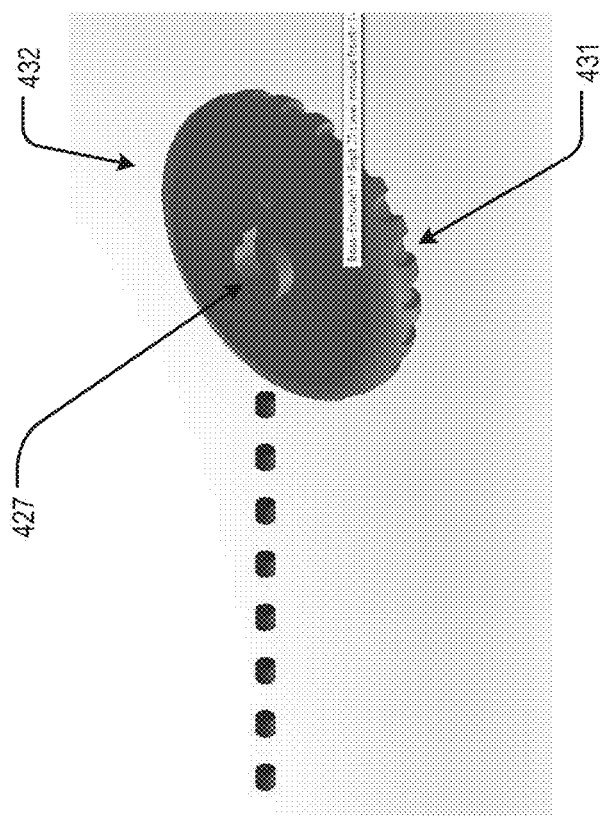
FIG. 4A is an illustration of a rotatable laser housing, according to an exemplary embodiment of the present disclosure.

FIG. 4A and FIG. 4B are illustrations of a rotatable laser housing of the hand held power tool assembly. FIG. 4A describes a rotatable laser housing 432 of a hand held power tool assembly, according to an embodiment. As shown, the rotatable laser housing 432 is generally circular with one or more tactile features 431 disposed on a peripheral surface. It can be appreciated that the shape of the rotatable laser housing 432 as cylindrical, resembling a wheel, is non-limiting and merely exemplary of a variety of shapes suitable for housing a rotatable laser apparatus. The rotatable laser housing 432 can be rotatably coupled to a hand held power tool of the hand held power too assembly via a rotatable coupling 427, the rotatable coupling 427 allowing for rotation while providing a channel for cabling connecting the rotatable laser apparatus to one or more PCBs of the hand held power tool, if necessary. The one or more tactile features 431 can be of any design such that a user, with a single hand, may be able to actuate a trigger of the hand held power tool while rotating the rotatable laser housing 432 with a digit of a hand. In an example, the one or more tactile features 431 can be depressions at defined intervals, alternating depressions and projections, projections at defined intervals, and the like, in order to achieve the function.

FIG. 4B provides a front view of a rotatable laser housing 432. The rotatable laser housing 432 includes a rotatable coupling 427 for coupling the rotatable laser housing 432 to a hand held power tool. A rotatable laser apparatus can be disposed with the rotatable laser housing 432 and oriented such that a laser emitting diode and a laser receiver are aligned with a laser emission aperture 424 and a laser receiving tunnel 425. The laser emission aperture 424 and the laser receiving tunnel 425, as described later with reference to FIG. 5A and FIG. 5B, allow for transmission of the emitted and received laser between the rotatable laser apparatus and the external environment.

As presented in FIG. 4B, the rotatable laser housing 432, and the rotatable laser apparatus therein, are configured to be rotated about the rotatable coupling 427 under user control. This allows the rotatable laser apparatus to provide measurements across a range of angles. In an example, the angular range of the rotatable laser housing 432 can be 0° to 360°. In an example, the angular range of the rotatable laser housing 432 can be 0° to 180°. The angular range of the rotatable laser housing 432 can be configured such that rotation necessary for measuring a room is possible. For instance, the angular range of the rotatable laser housing 432 can be configured to be able to provide a measurement of two side walls and a forward facing wall.

According to an embodiment, the hand held power tool assembly can be further supplemented with a secondary motor for, in coordination with one or more PCBs of the hand held power tool, automatic control of the rotatable laser housing. For example, a user can select a pre-determined operation and the hand held power tool assembly, using each of its motors and attendant laser measuring system under the control of processing circuitry on one or more PCBs, can automatically perform the operation.

Figures 5A, 5B:
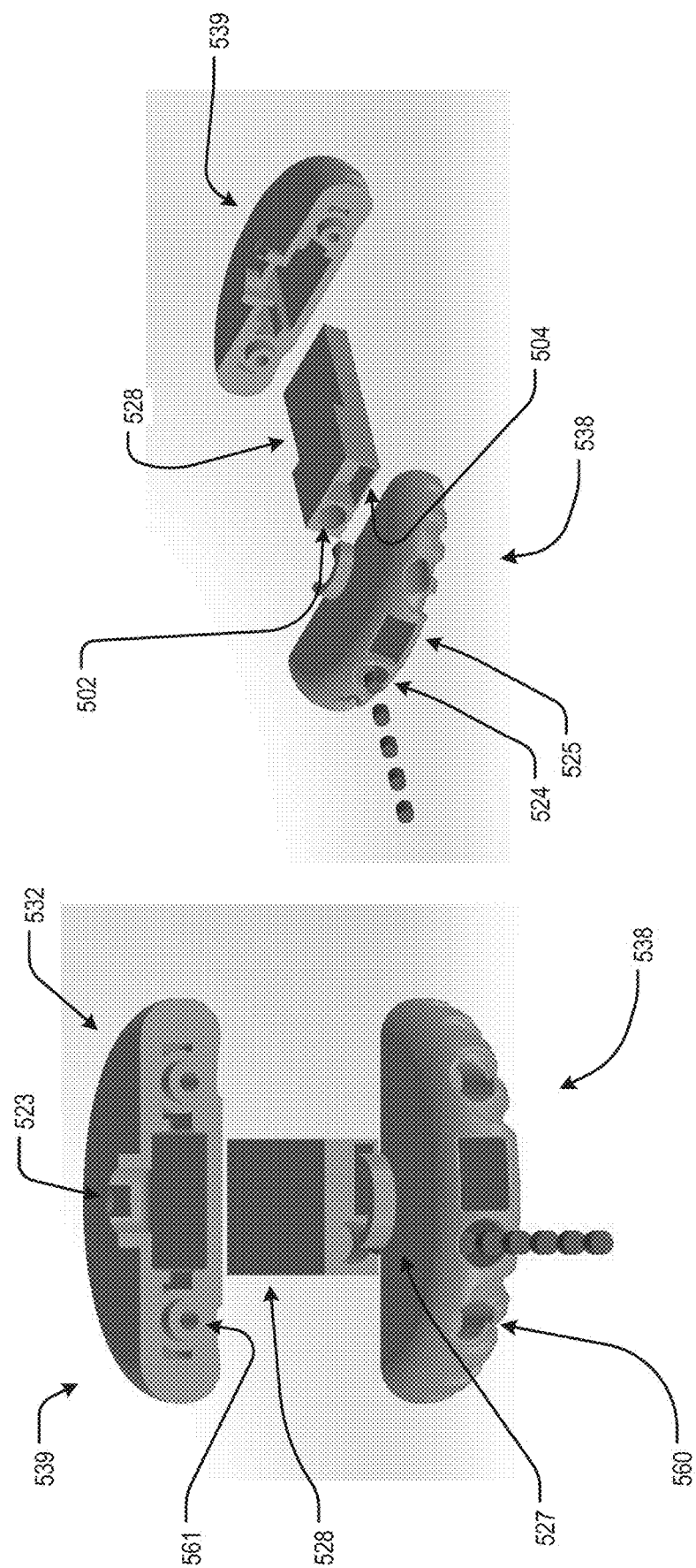
FIG. 5A is an illustration of an exploded view of a rotatable laser housing, according to an exemplary embodiment of the present disclosure.
FIG. 5B is an illustration of an exploded view of a rotatable laser housing, according to an exemplary embodiment of the present disclosure.

FIG. 5A, and FIG. 5B illustrate exploded views of a rotatable laser housing of a hand held power tool assembly. With reference to both FIG. 5A and FIG. 5B, the rotatable laser housing 532 is separable along a midline and includes, in an example, a first component 538 and a second component 539. The first component 538 and the second component 539 can be coupled via one or more mounting apertures 560 on the first component 538 and one or more mounting fixtures 561 on the second component 539. The first component 538 and the second component 539 each include a contributing portion of a rotatable coupling 527 having a channel 523 which therethrough passes appropriate electrical connections. Partially disposed within both of the first component 538 and the second component 539 is a rotatable laser apparatus 528. The rotatable laser apparatus 528 includes a laser emitting diode 502 and a laser receiver 504. Accordingly, the rotatable laser apparatus 528 can be aligned such that the laser emitting diode 502 and the laser receiver 504 are aligned with a laser emission aperture 524 and a laser receiving tunnel 525 of the first component 538 of the rotatable laser housing 532.

According to an embodiment, and with appropriate modifications, in mutandis, the rotatable laser housing 532 can include a plurality of rotatable laser apparatuses having a plurality of corresponding laser emission apertures and laser receiving tunnels.

Figure 6:
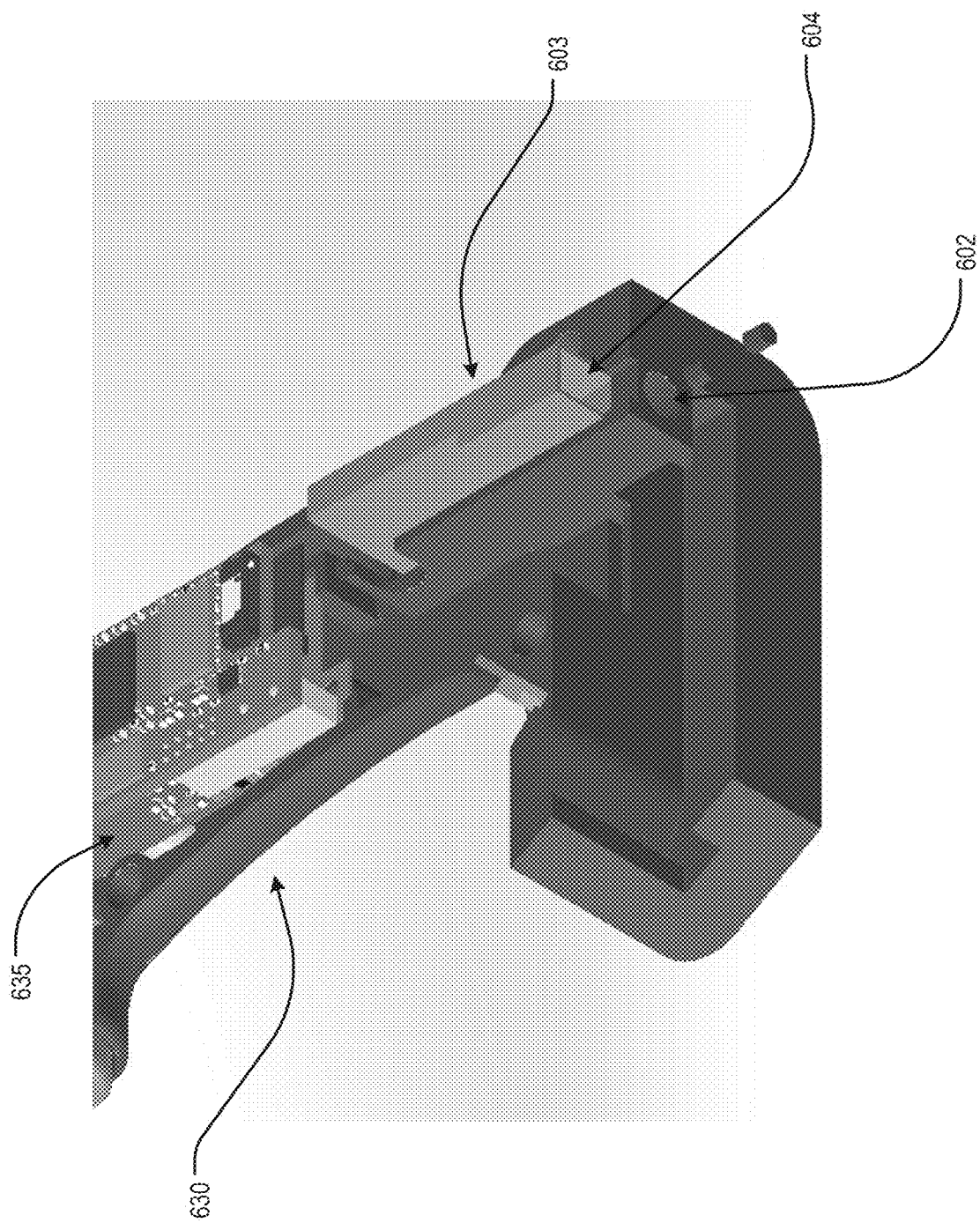
FIG. 6 is an illustration of an inferior aspect of a handle of a hand held power tool, according to an exemplary embodiment of the present disclosure.

FIG. 6 is an illustration of a handle of a hand held power tool and a stationary laser apparatus, therein. Specifically, a stationary laser apparatus 603 is disposed at a distal end of a handle 630 of the hand held power tool. The stationary laser apparatus 603 can be communicatively-coupled, via wired or wireless connection, to one or more PCBs 635 within the handle 630 of the hand held power tool. The stationary laser apparatus 603 can include a laser emitting diode 602 and a laser receiver 604. As shown in FIG. 6, the stationary laser apparatus 603 can be aligned within the handle 630 and configured to measure, for example, a distance from the hand held power tool to the ground. Additionally, the stationary laser apparatus 603 can be configured to measure a component of orientation of the hand held power tool.

According to an embodiment, the stationary laser apparatus 603 can be one of a plurality of stationary laser apparatuses arranged at the distal end of the handle 630 of the hand held power tool. In addition, at least one of the stationary laser apparatus 603 or the plurality of stationary laser apparatuses may be configured to be rotatable. Alternatively, at least one of the stationary laser apparatus 603 or the plurality of stationary laser apparatuses may be arranged askew of an axis of the hand held power tool.

FIG. 7A to FIG. 7D provide illustrations of interactive modules displayed on a display of a hand held power tool assembly during a variety of operations.

Figure 7A:
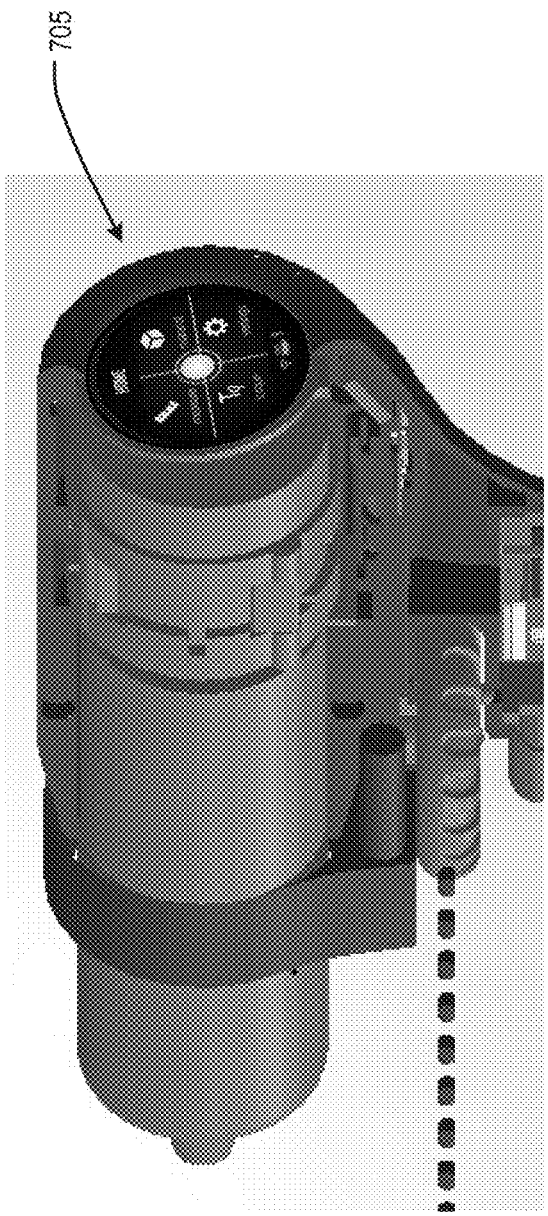
FIG. 7A is an illustration of a display of a hand held power tool, according to an exemplary embodiment of the present disclosure.

According to an embodiment, and as shown in FIG. 7A, a display 705 can display an exemplary 'HOME' screen. In an example, the 'HOME' screen provides a user with the ability to select a variety of tasks, including a distance measuring tool, a torque measuring tool, a material selection tool, or a settings tool. In addition, a circular object in the middle of the display 705 can be configured to reflect the orientation of the hand held power tool as determined from an accelerometer/gyroscope module, calculations based upon a laser measuring system, or a combination thereof. In an embodiment, the distance measuring tool employs the laser measuring system, the torque measuring tool probes the energy used by the motor, and the material selection tool receives user input or can determine material from other inputs (e.g. bit size, torque value, velocity of power tool, etc.).

In an example, a user selects the torque measuring tool. The user can then establish a maximum allowable torque for a specific operation. During operation of the hand held power tool, therefore, when the maximum allowable torque of the bit is reached, as determined from the energy used by the motor of the hand held power tool, a message can be generated to the display 705 alerting the user to disengage.

Figure 7B:
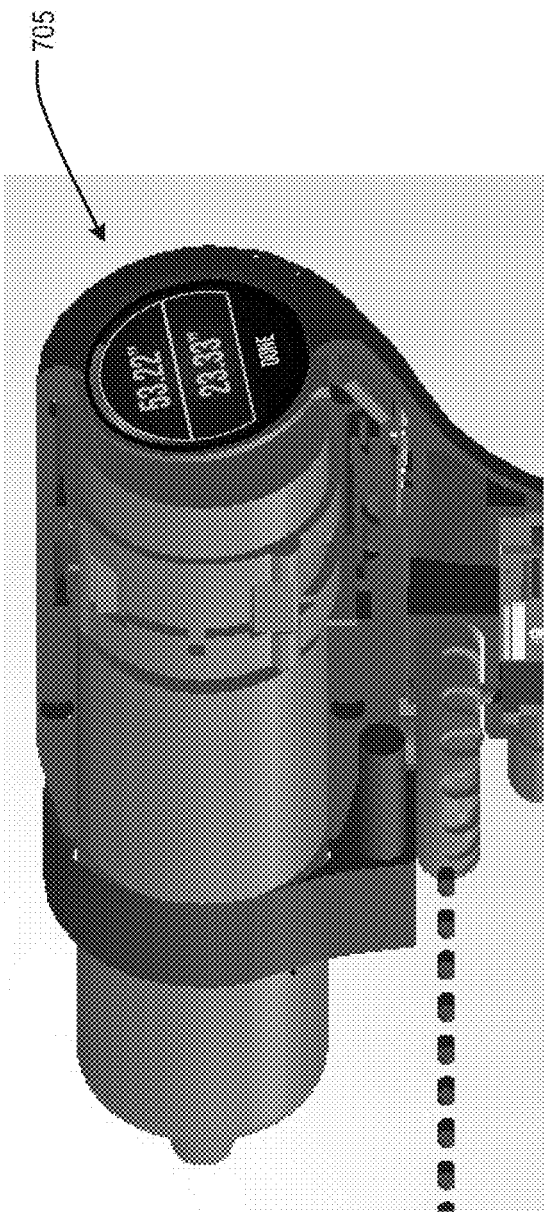
FIG. 7B is an illustration of a display of a hand held power tool, according to an exemplary embodiment of the present disclosure.

In another example, a user selects the distance measuring tool, whereby the laser measuring system is employed to provide distances relative to the at least one laser apparatus of the laser measuring system. As shown in FIG. 7B, the user has selected inches and the appropriate distances are displayed on the display 705. The top value can, for example, reflect a distance from a rotatable laser apparatus to a surface, depending on angular orientation, and the bottom value can reflect, for example, a distance from a stationary laser apparatus to a surface. For instance, with reference to FIG. 7B, the hand held power tool is being held 53.22" from a wall directly ahead of the hand held power tool and 23.33" from the ground.

According to an embodiment, and as will be described in detail with respect to FIG. 11A and FIG. 11B, a user may prescribe a desired distance relative to a surface of a room. In such a case, immediately prior to an operation, a user can dimension the room via the laser measuring system of the hand held power tool assembly. Having dimensioned the room, the user can stipulate that an operation occur at a specific distance from a wall. For example, the user can stipulate that a hole be drilled at a distance of a 2' from the right wall of the room. Accordingly, the display 705 can generate a screen reflecting the position of the hand held power tool from the right wall relative to a zero line. Further, the display 705 can modify colors during use to indicate proximity of the user to the desired position.

According to an embodiment, and as shown in FIG. 7C, a display 705 can display an exemplary 'HOME' screen. In an example, the 'HOME' screen provides a user with the ability to select a variety of tasks, including a depth measuring tool, a stud finder tool, a more tool, or an instructions tool. In an embodiment, the depth measuring tool employs the laser measuring system and the stud finder tool employs a magnetometer, said magnetometer being housed within the hand held power tool and being communicatively-coupled to processing circuitry of the one or more PCBs and, subsequently, the display 705.

In an example, a user selects the stud finder tool. Following a brief calibration of the magnetometer, the hand held power tool can be positioned proximate a wall. Slowly sliding the hand held power tool across the wall, the magnetometer can determine the location of metalwork within the wall and, according to the strength of the magnetic field, establish the location of studs. When a magnetic field strength surpasses a threshold magnetic field measured by the magnetometer, a message can be generated to the display 705 notifying the user that a stud has been found.

In another example, a user selects the depth measuring tool, whereby the laser measuring system is employed to provide a distance to a forward facing wall. As shown in FIG. 7D, the user has selected inches and the appropriate distance is displayed on the display 705. The displayed depth reflects the current position to the forward facing wall. During an operation, and as described with reference to FIG. 8, FIG. 9A and FIG. 9B, a zero position can be established prior to the operation. This zero position can reflect a distance from a tip of a bit within a chuck of the hand held power tool to the rotatable laser apparatus when the tip of the bit is in contact with the working surface. Subsequent movement of the tip of the bit relative to this zero position can be displayed on the display 705 as a positive or negative depth.

Figure 8:
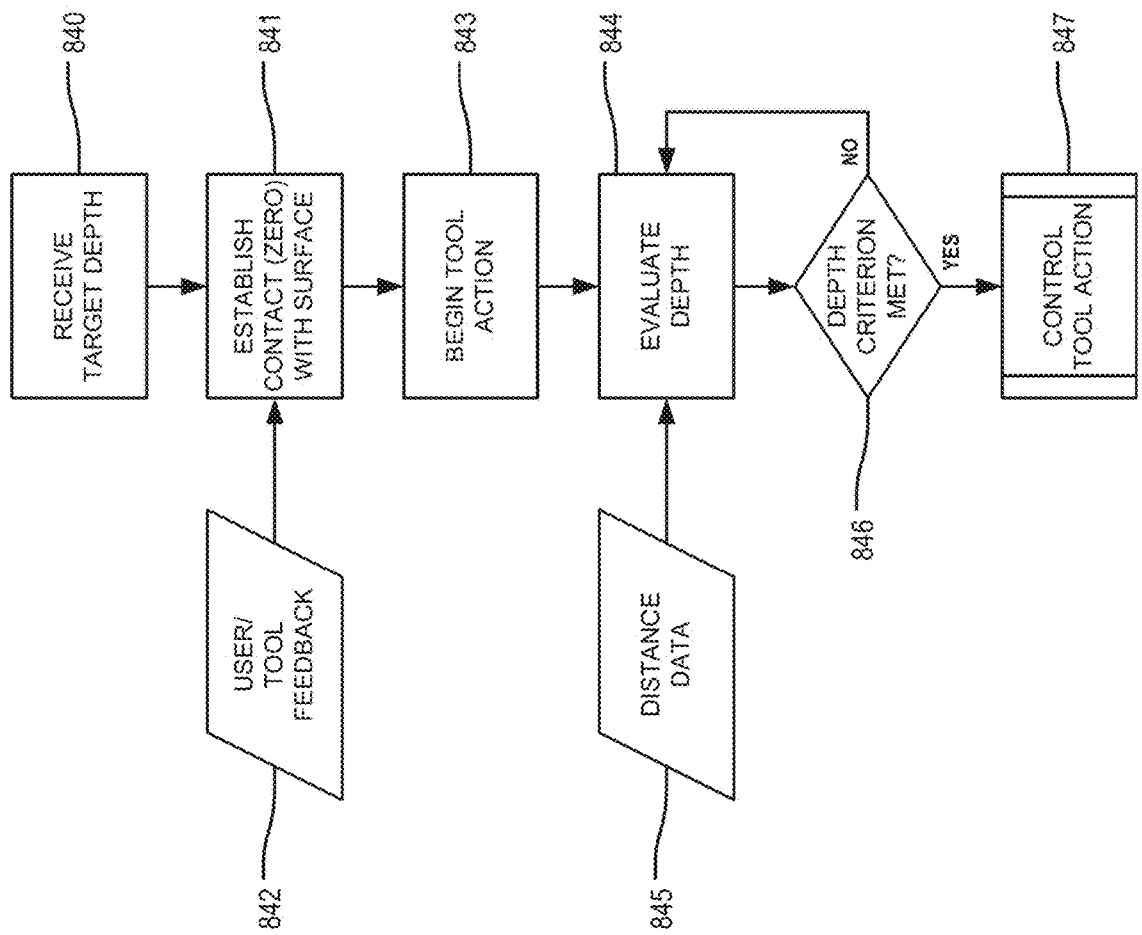
FIG. 8 is a flowchart of an exemplary embodiment of a hand held power tool.

As alluded to above, FIG. 8 describes a depth measuring implementation of the hand held power tool. Specifically, FIG. 8 is a flowchart of an implementation of the hand held power tool in a depth measuring application.

First, at step 840, a user provides a target depth to the hand held power tool. The user can provide the target depth by tactile interaction with a display of the hand held power tool or by voice command, said voice command being monitored by a microphone of the hand held power tool.

Having established the target depth, at step 841, a contact point with the working surface must be determined. In other words, in order to be able to determine the depth at which a bit of the hand held power tool is within a material being worked, the hand held power tool must understand the starting position. To this end, processing circuitry on one or more PCBs of the hand held power tool can receive inputs from a laser measuring system at step 842. In particular, the processing circuitry can receive data inputs from a rotatable laser apparatus within a rotatable laser housing, the rotatable laser apparatus being aligned with a rotational axis of a chuck of the hand held power tool. Once a tip of the bit of the hand held power tool is in contact with the working surface, the user can indicate via tactile or verbal command that the depth measurement can be set to zero.

At step 843, the material can now be worked. As the bit travels into the material, the depth of the bit within the material can be evaluated at step 844. In particular, the processing circuitry can receive data inputs from the laser measuring system at step 845 and the current depth of the bit can be compared against the user defined target depth. For example, at step 846, if the current depth of the bit is not equal to the user defined target depth, no action is taken and the process returns to step 844 wherein the current depth continues to be evaluated.

If the depth criterion has been met, an appropriate action can be taken at step 847. According to an embodiment, the processing circuitry, upon determining that the target depth has been achieved, can control a motor of the hand held power tool in order to stop rotation of the bit and subsequent working of the material. For instance, via the motor controller, the processing circuitry can deactivate the motor, thereby stopping rotation of the bit and preventing further penetration into the material.

In a similar way to FIG. 8, FIG. 9A describes a depth measuring implementation of the hand held power tool. Specifically, FIG. 9A is a flowchart of an implementation of the hand held power tool in a depth measuring application. Unlike FIG. 8, however, the process of FIG. 9A generates an alert to the user that a desired penetration depth has been met. It should be appreciated that the motor control of FIG. 8 and the alert generation of FIG. 9A can be combined in a single embodiment or can be implemented independently.

First, at step 940, a user provides a target depth to the hand held power tool. The user can provide the target depth by tactile interaction with a display of the hand held power tool or by voice command, said voice command being monitored by a microphone of the hand held power tool.

Having established the target depth, at step 941, a contact point with the working surface must be determined. In other words, in order to be able to determine the depth at which a bit of the hand held power tool is within a material being worked, the hand held power tool must understand the starting position. To this end, processing circuitry on one or more PCBs of the hand held power tool can receive inputs from a laser measuring system at step 942. In particular, the processing circuitry can receive data inputs from a rotatable laser apparatus within a rotatable laser housing, the rotatable laser apparatus being aligned with a rotational axis of a chuck of the hand held power tool. Once a tip of the bit of the hand held power tool is in contact with the working surface, the user can indicate via tactile or verbal command that the depth measurement can be set to zero.

At step 943, the material can now be worked. As the bit travels into the material, the depth of the bit within the material can be evaluated at step 944. In particular, the processing circuitry can receive data inputs from the laser measuring system at step 945 and the current depth of the bit can be compared against the user defined target depth. For example, at step 946, if the current depth of the bit is not equal to the user defined target depth, no action is taken and the process returns to step 944 and the current depth continues to be evaluated.

If the depth criterion has been met, an appropriate action can be taken at step 947. According to an embodiment, the processing circuitry, upon determining that the target depth has been achieved, can generate an alert to the user informing them that the target depth has been met.

According to an embodiment, as shown in FIG. 9B, the alert can be generated on the display 905 of the hand held power tool. The alert can be a visual alert notifying the user that, for instance, the target depth of 2.24" has been surpassed, the current depth is 3.50", and the user should stop drilling. In combination with or independent from the visual alert, an audio alert and/or a haptic alert may be generated. In particular, such alerts can be generated when the user may be operating the hand held power tool at a position wherein the display 905 is not visible. In such instances, an audio alert can be generated via a speaker. Further, via a haptic motor disposed, for example, within the handle of the hand held power tool, a vibratory alert may be provided to the user. It should be appreciated that the above alert methods are non-limiting and are merely exemplary of a variety of alert methods that may be used to notify a user when a target criterion has been met.

Figure 10:
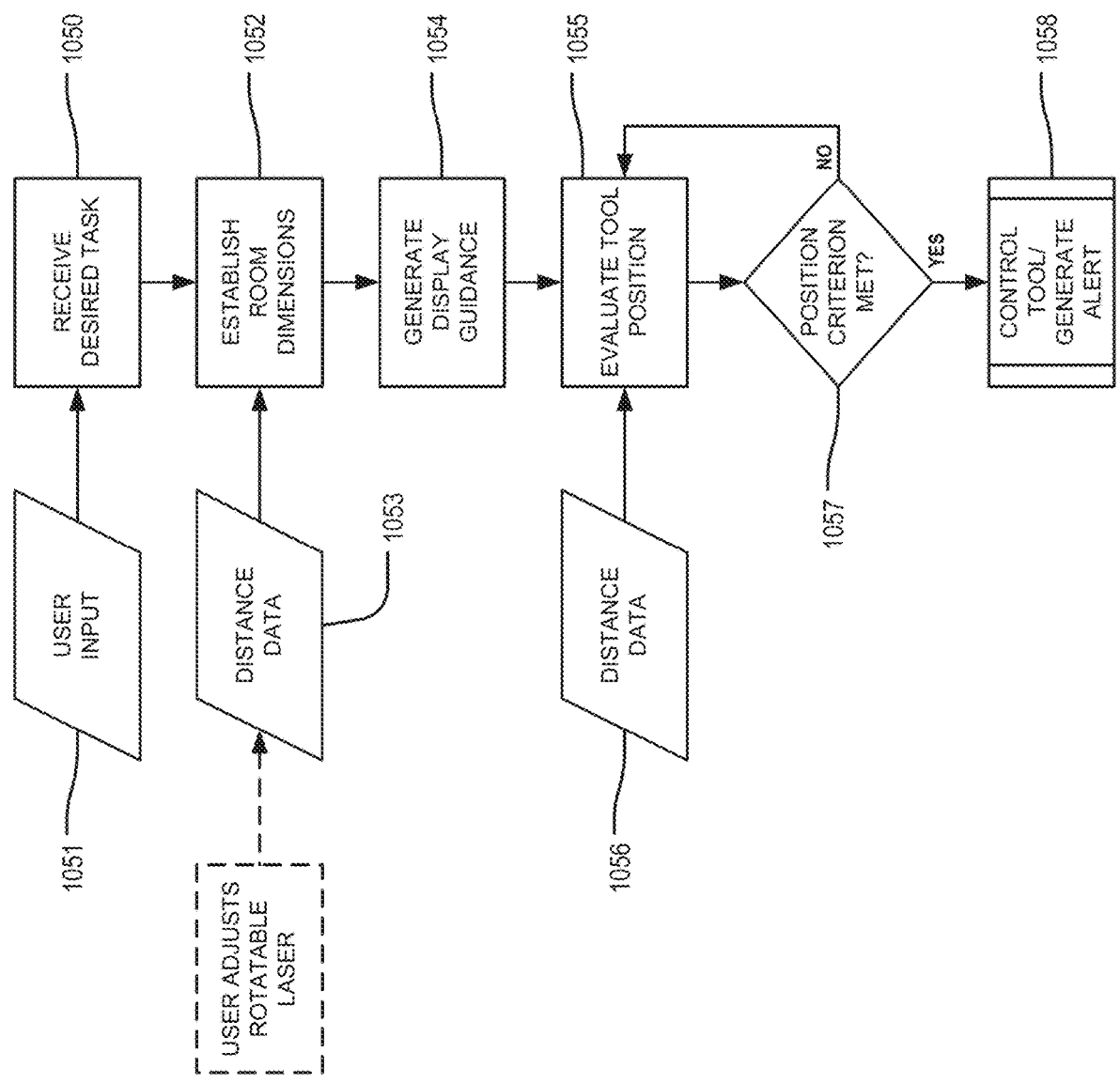
FIG. 10 is a flowchart of an exemplary embodiment of a hand held power tool.

Referring now to FIG. 10, a flowchart of an additional implementation of the hand held power tool is described. According to an embodiment, and as shown in FIG. 10, a user has determined that an action should be taken at a specific location on a surface of a wall relative to surrounding structures.

Beginning at step 1050, processing circuitry of the hand held power tool receives input from the user, at step 1051, indicating a task to be performed. The input can be received at the processing circuitry via user interaction with a display on the rear of the hand held power tool. In an example, the task can be an operation that creates a centered hole on a wall that is centered relative to adjacent walls.

At step 1052, the room must be dimensioned. In doing this, the user is guided by visual and/or audible instruction in moving the rotatable laser housing, and rotatable laser apparatus therein, such that measurements of a left wall and a right wall can be determined at step 1053. Having determined the current distance to the left wall and to the right wall, the processing circuitry of the hand held power tool may determine that a centered position requires a movement of the hand held power tool of 2'3" to the left. In other words, this movement requires the hand held power tool to be 2'3" closer to the wall on the left. This guidance can be generated via speakers and via the display, at step 1054.

At step 1055, while the user is moving the hand held power tool into position, the distance between the hand held power tool and the left wall is determined, at step 1056, from data gathered from the rotatable laser apparatus.

At step 1057, the current position of the hand held power tool is compared with the target position of the hand held power tool relative to the wall on the left. If the current position and the target position do not match, the discrepancy can be reflected on the display and the user can continue to move the hand held power tool, accordingly.

Having achieved the target position, at step 1058, an appropriate action can be taken. For example, the tool can be controlled via the motor controller or similar. Similar to the above, an alert can be generated to the user notifying the user that the hand held power tool is centered relative to the left wall and the right wall. This alert can be an audible alert, a visual alert, or a haptic alert.

Figure 11B:
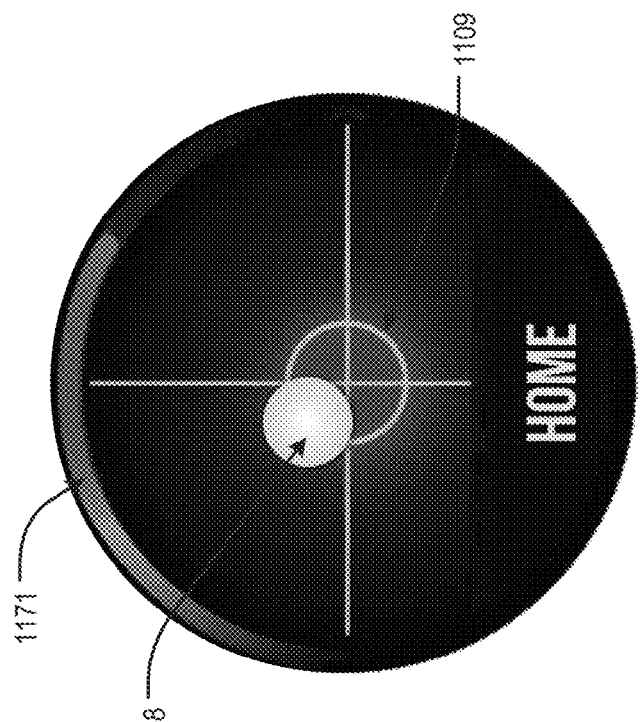
FIG. 11B is an illustration of a display of a hand held power tool during an alignment operation, according to an exemplary embodiment of the present disclosure.
Figure 11A:
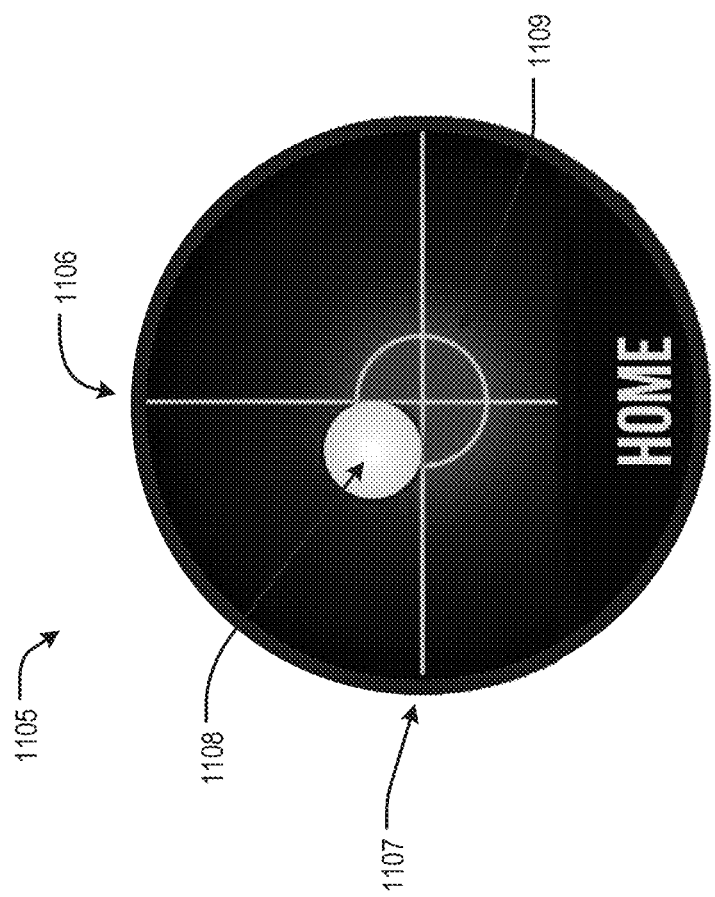
FIG. 11A is an illustration of a display of a hand held power tool during an alignment operation, according to an exemplary embodiment of the present disclosure.

Further to the above and with reference now to FIG. 11A and FIG. 11B, the display may provide a visualization of the current position of the hand held power tool and a target position of the hand held power tool.

According to an embodiment, having entered a dimensioning related implementation, a current position 1108 of the hand held power tool is indicated by a ball, as shown on a display 1105 of FIG. 11A. A target position 1109, therefore, is indicated by the intersection of a vertical axis 1106 and a horizontal axis 1107.

In the embodiment described in FIG. 11A, the display 1105 can reflect a position and orientation of a hand held power tool in two dimensions, three dimensions, or a combination thereof. For example, the display 1105 can reflect the tilt and orientation of the hand held power tool relative to ground. The display 1105 can further reflect the position of the hand held power tool relative to the dimensions of a room. For example, the size and shape of the ball, indicating the current position 1108, can be modified to indicate how the hand held power tool should be tilted or otherwise manipulated.

As shown in FIG. 11A, the display 1105 provides guidance to the user as to how the hand held power tool can be manipulated to arrive at the target position 1109. As the current position 1108 of the hand held power tool moves closer to the target position 1109, as shown in FIG. 11B, a scale 1171 on the periphery of the display 1105 can indicate the proximity of the user to the target position 1109. For instance, as an indicator on the scale 1171 moves clockwise around the display 1105, the user can understand that they are getting closer to the target position 11B. If moving a step wise manner, this can provide the user with incremental assistance as to their relative position.

Next, a hardware description of the hand held power tool assembly according to exemplary embodiments is described with reference to FIG. 12. In an example, FIG. 12 describes a hand held power tool including a single processing circuitry in communication with and controlling each laser apparatus and the display. In another example, FIG. 12 describes a hand held power tool having multiple processing circuitries for mutually communicating with but separately controlling each laser apparatus and the display. In each of the non-limiting examples described above, the display may be a user interface responsive to user input. For brevity, certain assembly components described above have been omitted.

Figure 12:
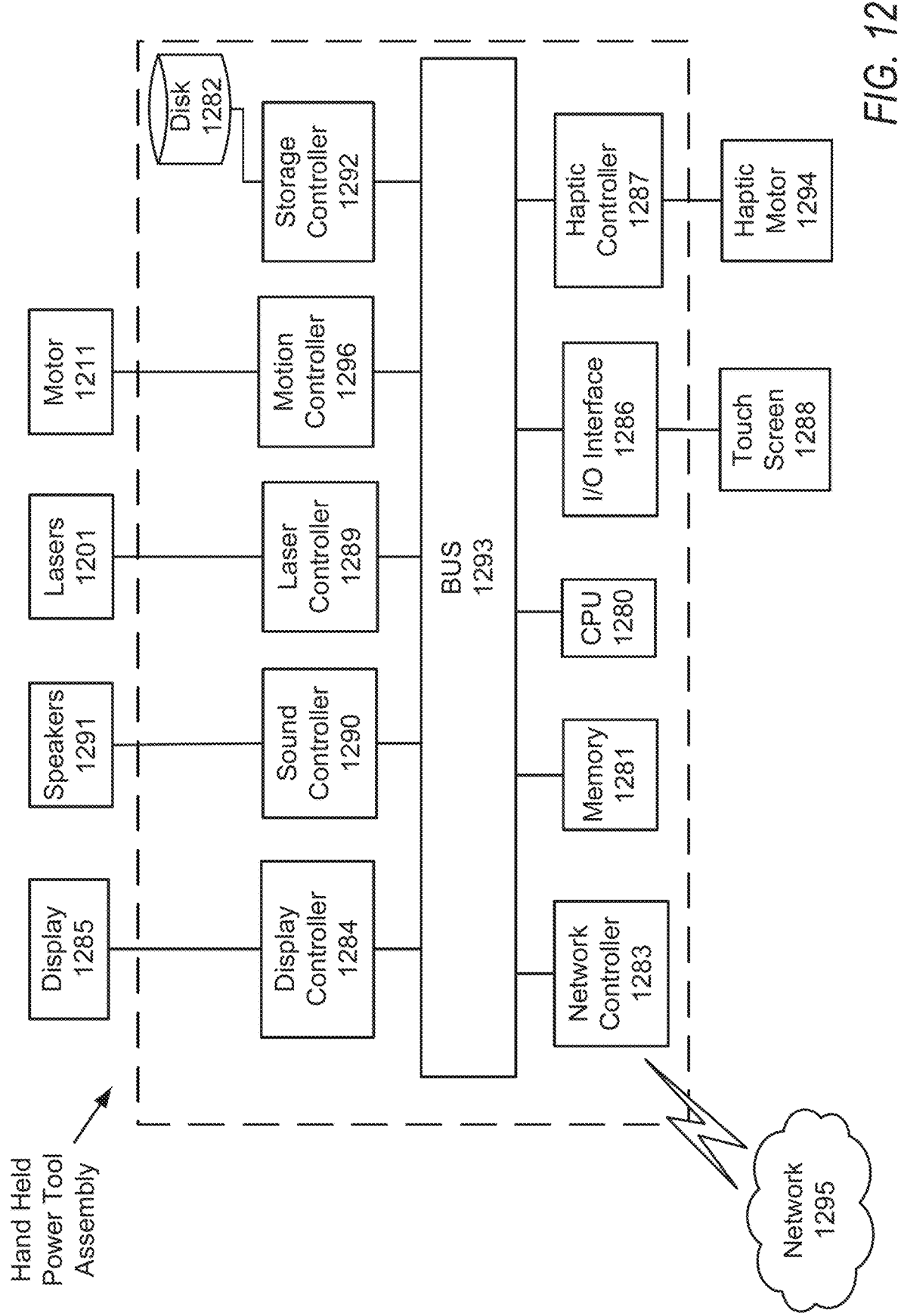
FIG. 12 is a schematic describing hardware of a hand held power tool, according to an exemplary embodiment of the present disclosure.

In FIG. 12, the hand held power tool assembly includes a CPU 1280 which performs the processes described above/below. The process data and instructions may be stored in memory 1281. These processes and instructions may also be stored on a storage medium disk 1282 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the hand held power tool assembly communicates, such as a server or computer.

Further, the claimed advancements may be provided as a utility application, background daemon, or component of an operating system, or combination thereof, executing in conjunction with CPU 1280 and an operating system such as Microsoft Windows 7, UNIX, Solaris, LINUX, Apple MAC-OS and other systems known to those skilled in the art.

The hardware elements in order to achieve the hand held power tool assembly may be realized by various circuitry elements, known to those skilled in the art. For example, CPU 1280 may be a specially-programmed Xenon or Core processor from Intel of America or an Opteron processor from AMD of America, or may be other processor types that would be recognized by one of ordinary skill in the art. Alternatively, the CPU 1280 may be implemented on an FPGA, ASIC, PLD or using discrete logic circuits, as one of ordinary skill in the art would recognize. Further, CPU 1280 may be implemented as multiple processors cooperatively working in parallel to perform the instructions of the inventive processes described above.

The hand held power tool assembly in FIG. 12 also includes a network controller 1283, such as an Intel Ethernet PRO network interface card from Intel Corporation of America, for interfacing with network 1295. As can be appreciated, the network 1295 can be a public network, such as the Internet, or a private network such as an LAN or WAN network, or any combination thereof and can also include PSTN or ISDN sub-networks. The network 1295 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The hand held power tool assembly further includes a display controller 1284, such as a NVIDIA GeForce GTX or Quadro graphics adaptor from NVIDIA Corporation of America for interfacing with a display 1285, such as a Hewlett Packard HPL2445w LCD monitor. In an embodiment, the display 1285 is a flexible OLED touch screen 1288. A general purpose I/O interface 1286 interfaces the touch screen 1288 on or separate from display 1285.

A sound controller 1290 is also provided in the hand held power tool assembly, such as Sound Blaster X-Fi Titanium from Creative, to interface with speakers/microphone 1291, thereby providing sounds and/or music. In an embodiment, the speakers/microphone 1291 allow for voice control of the hand held power tool assembly and for providing notifications to the user of pertinent events.

A laser controller 1289 is also provided in the hand held power tool assembly to interface with laser apertures 1201 comprising laser emitting diodes and laser receivers. In an embodiment, the laser controller 1289 is configured to control the operation of a laser emitting diode and laser receiver.

A haptic controller 1287 is also provided in the hand held power tool assembly to interface with a haptic motor 1294. The haptic motor 1294 may be provided within the handle of the hand held power tool and may be configured to provide a vibratory alert to the user of the hand held power tool under specific situations. For example, if a torque value of the chuck surpasses a safe level for drilling, a vibratory alert may be provided to the user. In addition, if the user is operating the hand held power tool assembly at a height, for instance, at which the display 1285 cannot be viewed, a vibratory alert can be provided when a prescribed depth of drilling has been reached.

The general purpose storage controller 1292 connects the storage medium disk 1282 with communication bus 1293, which may be an ISA, EISA, VESA, PCI, or similar, for interconnecting all of the components of the hand held power tool assembly. A description of the general features and functionality of the display 1285 as well as the display controller 1284, storage controller 1292, network controller 1283, sound controller 1290, laser controller 1289, haptic controller 1287, and general purpose I/O interface 1286 is omitted herein for brevity as these features are known.

Embodiments of the present disclosure may also be as set forth in the following parentheticals.

(1) A hand held power tool, comprising a primary motor, a chuck operatively-coupled to the primary motor, a body housing the primary motor, a display mounted on a rear surface of the body, said display being positioned opposite the chuck, a handle projecting from the body, a rotatable distancing laser disposed within a rotatable laser housing, the rotatable laser housing being rotatably coupled to the body immediately inferior to the chuck, the rotatable laser housing being disposed such that a laser beam emitted from the rotatable distancing laser is emitted in a plane parallel to a plane of an axis of rotation of the chuck, and a stationary distancing laser disposed within the handle of the hand held power tool and arranged such that a laser beam emitted from the stationary distancing laser is orthogonal to an emitted laser beam of the rotatable distancing laser.

(2) The hand held power tool according to (1), wherein the rotatable laser housing comprises one or more tactile features on a periphery thereof.

(3) The hand held power tool according to either (1) or (2), wherein the rotatable distancing laser can be angulated at least 90° from the axis of rotation of the chuck.

(4) The hand held power tool according to any of (1) to (3), further comprising a trigger disposed in the handle and immediately inferior of the rotatable laser housing.

(5) The hand held power tool according to any of (1) to (4), further comprising processing circuitry mounted within the handle, said processing circuitry being configured to control the rotatable distancing laser and the stationary distancing laser.

(6) The hand held power tool according to any of (1) to (5), wherein the processing circuitry is mounted to one or more printed circuit boards, said one or more printed circuit boards being housed within the handle.

(7) The hand held power tool according to any of (1) to (6), wherein the display is integrated with a touch screen.

(8) The hand held power tool according to any of (1) to (7), wherein the display is substantially circular.

(9) The hand held power tool according to any of (1) to (8), further comprising a gyroscope.

(10) The hand held power tool according to any of (1) to (9), further comprising a haptic motor disposed within the handle, and processing circuitry configured to generate a vibratory alert to the user via the haptic motor.

(11) The hand held power tool according to any of (1) to (10), further comprising processing circuitry configured to receive a target torque value of the primary motor from the user, compare a current torque value of the primary motor to the target torque value, and disengage the primary motor when the current torque value matches the target torque value.

(12) The hand held power tool according to any of (1) to (11), further comprising a speaker, and processing circuitry configured to generate an audible alert via the speaker.

(13) The hand held power tool according to any of (1) to (12), wherein the rotatable laser housing is separable into a first component and a second component along a midline, the rotatable distancing laser being housed therein.

(14) The hand held power tool according to any of (1) to (13), wherein the rotatable laser housing includes a laser emission aperture and a laser receiving tunnel, said laser emission aperture and said laser receiving tunnel allowing passage of the laser therethrough.

(15) The hand held power tool according to any of (1) to (14), further comprising a secondary motor within the body, said secondary motor being mechanically-coupled to the rotatable laser housing.

(16) The hand held power tool according to any of (1) to (15), further comprising processing circuitry configured to receive, from a user, a target depth of an operation of the hand held power tool, receive, from the rotatable distancing laser, a current depth of the operation, and disengage, when the current depth matches the target depth, the secondary motor.

(17) A hand held power tool, comprising a motor, a chuck operatively-coupled to the motor, a body housing the motor, a handle projecting from the body, a rotatable distancing laser disposed within a rotatable laser housing, the rotatable laser housing being rotatably coupled to the body immediately inferior to the chuck, the rotatable laser housing being arranged such that a laser beam emitted from the rotatable distancing laser is emitted in a plane parallel to a plane of an axis of rotation of the chuck, a stationary distancing laser disposed within the handle of the hand held power tool and arranged such that a laser beam emitted from the stationary distancing laser is orthogonal to an emitted laser beam of the rotatable distancing laser, and processing circuitry configured to control the rotatable distancing laser and the stationary distancing laser, said processing circuitry being housed within the handle.

(18) The hand held power tool according to claim 17, wherein the processing circuitry is mounted to a plurality of printed circuit boards within the handle, said plurality of printed circuit boards being stacked.

(19) A hand held power tool, comprising a motor, a chuck operatively-coupled to the motor, a body housing the motor, a handle projecting from the body, a display mounted on a rear surface of the body and visible to a user, said display being positioned opposite the chuck, and processing circuitry configured to control display of distancing information on the display, said distancing information being received from at least one distancing laser, wherein the display is substantially circular.

(20) The hand held power tool according to (19), wherein the display is integrated with a touch screen.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A power tool, comprising:
   a primary motor;
   a chuck operatively-coupled to the primary motor;
   a body housing the primary motor;
   a display mounted on a rear surface of the body, said display being positioned behind the chuck and in a plane generally orthogonal to an axis of rotation of the chuck;
   a handle projecting from the body;
   a distancing laser disposed within a laser housing, the laser housing being rotatably coupled to the body of the power tool, below an axis of rotation of the chuck, the distancing laser being configured to emit a distancing laser beam parallel to a plane of an axis of rotation of the chuck, and the laser housing being configured to allow the distancing laser to rotate in a plane parallel to the axis of rotation of the chuck; and
   a secondary motor which is operatively-coupled to the laser housing and configured to drive the rotation of the distancing laser in a plane parallel to the axis of rotation of the chuck.

2. The power tool of claim 1, wherein the power tool further comprises, a second distancing laser disposed within the handle of the power tool and arranged such that a second laser beam emitted from the second distancing laser is orthogonal to the distancing laser beam.

3. The power tool of claim 1, wherein the laser housing is configured to rotate about the body of the power tool.

4. The power tool of claim 1, wherein the power tool further comprises:
   a distancing laser receiver disposed proximate to the distancing laser and configured to receive the distancing laser beam;
   processing circuitry disposed within the handle of the power tool, said processing circuitry being configured to determine from the distancing laser receiver, the distance between the rotatable distancing laser and a surface off which an emitted distancing laser beam reflects; and
   a display disposed on a rear surface of the body, said display being configured to show the distance between the power tool and a target surface upon which the emitted distancing laser beam reflects.

5. The power tool of claim 4, wherein the processing circuitry is further configured to control the rotation of the distancing laser.

6. The power tool of claim 4, wherein the processing circuitry is further configured to receive a target torque value of the primary motor from a user, compare a current torque value of the primary motor to the target torque value, and disengage the primary motor when the current torque value of the primary motor equals the target torque value.

7. The power tool of claim 4, wherein a touch sensitive screen is disposed within the display, the touch sensitive screen being configured to receive input from a user and relay that input to the processing circuitry.

8. The power tool of claim 4, wherein the processing circuitry is further configured to receive a target depth of operation from a user, receive a current depth of operation from the rotatable distancing laser, and disengage the primary motor when the target depth of operation equals the current depth of operation.

9. The power tool of claim 4, wherein the power tool further comprises a speaker configured to receive an alert signal from the processing circuitry and produce an audible alert sound upon receipt of the alert signal.

10. A hand held power tool, comprising:
    a primary motor;
    a chuck operatively-coupled to the primary motor;
    a body housing the primary motor;
    a handle projecting from the body; and
    a rotatable distancing laser disposed within a rotatable laser housing, the rotatable laser housing being rotatably coupled to the body of the power tool, below an axis of rotation of the chuck, the rotatable laser housing being disposed such that a laser beam emitted from the rotatable distancing laser is emitted in a plane parallel to a plane of an axis of rotation of the chuck, wherein the rotatable laser housing is configured to be rotatable during operation of the power tool.

11. The power tool of claim 10, wherein the power tool further comprises, a second distancing laser disposed within the handle of the power tool and arranged such that a second laser beam emitted from the second distancing laser is orthogonal to the distancing laser and directed downward from the handle of the power tool.

12. The power tool of claim 11, wherein the rotatable distancing laser is operatively-coupled to the primary motor and configured to rotate about the body of the power tool.

13. The power tool of claim 10, wherein the power tool further comprises:
    processing circuitry disposed within the handle of the power tool, said processing circuitry being configured to determine the distance between the power tool and a target surface upon which an emitted laser beam reflects; and
    a display disposed on a rear surface of the body, said display being configured to show the distance between the power tool and a target surface upon which the emitted laser beam reflects.

14. The power tool of claim 13, wherein the processing circuitry is further configured to:
    receive a target torque value of the primary motor from a user, compare a current torque value of the primary motor to the target torque value, and increase or decrease the torque of the primary motor such that the current torque value of the primary motor equals the target torque value; and
    receive a target depth of operation from the user, receive a current depth of operation from the rotatable distancing laser, and disengage the primary motor when the target depth of operation equals the current depth of operation.

15. The power tool of claim 13, wherein the processing circuitry is further configured to determine one component value of a three-dimensional position of the power tool from the distances between the power tool and the ground and the power tool and a target surface, and use the component value of the three-dimensional position to update the display with positional information for the power tool relative to at least one surface in a room other than the target surface.

16. The power tool of claim 13, wherein the power tool further comprises a microphone which is configured to receive verbal input from a user and relay that information to the processing circuitry.

17. The power tool of claim 13, wherein the power tool further comprises a magnetometer disposed in the chuck, the magnetometer being configured to locate metal beneath a target surface.

18. The power tool of claim 13, wherein the processing circuitry is further configured to receive a working material input from the user, determine a target torque value from the working material input, compare a current torque value of the primary motor to the target torque value, and increase or decrease the primary motor torque such that the current torque value equals the target torque value.

* * * * *